United States Patent
Kim et al.

(10) Patent No.: US 10,726,303 B1
(45) Date of Patent: Jul. 28, 2020

(54) LEARNING METHOD AND LEARNING DEVICE FOR SWITCHING MODES OF AUTONOMOUS VEHICLE BASED ON ON-DEVICE STANDALONE PREDICTION TO THEREBY ACHIEVE SAFETY OF AUTONOMOUS DRIVING, AND TESTING METHOD AND TESTING DEVICE USING THE SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/725,064

(22) Filed: Dec. 23, 2019

Related U.S. Application Data

(60) Provisional application No. 62/798,676, filed on Jan. 30, 2019.

(51) Int. Cl.
 *G06K 9/62* (2006.01)
 *G06K 9/00* (2006.01)
 (Continued)

(52) U.S. Cl.
 CPC ......... *G06K 9/6262* (2013.01); *G05D 1/0061* (2013.01); *G05D 1/0088* (2013.01);
 (Continued)

(58) Field of Classification Search
 CPC ............ G06K 9/6262; G06K 9/00791; G06K 9/6232; G06N 3/0472; G06N 3/08; G05D 1/0061; G05D 1/0088; G05D 2201/0213
 See application file for complete search history.

(56) References Cited

U.S. PATENT DOCUMENTS

| 9,965,719 B2 * | 5/2018 | Choi ........................ G06N 3/08 |
| 10,304,009 B1 * | 5/2019 | Kim ...................... G06N 3/0454 |

(Continued)

OTHER PUBLICATIONS

Ren, Shaoging, et al. "Faster r-cnn: Towards real-time object detection with region proposal networks." Advances in neural information processing systems. 2015.

*Primary Examiner* — John B Strege
(74) *Attorney, Agent, or Firm* — Husch Blackwell LLP

(57) ABSTRACT

A learning method for generating parameters capable of representing a degree of credibility of an object detection during a process of the object detection is provided. And the method includes steps of: (a) a learning device instructing a convolutional layer to generate a convolutional feature map by applying a convolutional operation to a training image; (b) the learning device instructing an anchor layer to generate an RPN confidence map including RPN confidence scores; (c) the learning device instructing an FC layer to generate CNN confidence scores, to thereby generate a CNN confidence map; and (d) the learning device instructing a loss layer to learn parameters in the CNN and the RPN by
(Continued)

performing backpropagation using an RPN loss and a CNN loss, generated by referring to the RPN confidence map, the CNN confidence map, an estimated object detection result and a GT object detection result.

24 Claims, 5 Drawing Sheets

(51) Int. Cl.
    *G06N 3/08*     (2006.01)
    *G05D 1/00*     (2006.01)
    *G06N 3/04*     (2006.01)
(52) U.S. Cl.
    CPC ....... *G06K 9/00791* (2013.01); *G06K 9/6232* (2013.01); *G06N 3/0472* (2013.01); *G06N 3/08* (2013.01); *G05D 2201/0213* (2013.01)

(56) References Cited

U.S. PATENT DOCUMENTS

| | | | |
|---|---|---|---|
| 10,402,686 B1* | 9/2019 | Kim | G06K 9/6232 |
| 10,402,978 B1* | 9/2019 | Kim | G06T 7/73 |
| 10,452,959 B1* | 10/2019 | Gautam | G06K 9/6232 |
| 10,474,930 B1* | 11/2019 | Kim | G06N 3/0454 |
| 2017/0169315 A1* | 6/2017 | Vaca Castano | G06K 9/3233 |
| 2017/0206431 A1* | 7/2017 | Sun | G06N 3/084 |
| 2018/0137642 A1* | 5/2018 | Malisiewicz | G06K 9/6271 |
| 2019/0073553 A1* | 3/2019 | Yao | G06K 9/46 |
| 2019/0251383 A1* | 8/2019 | Senay | G06K 9/6232 |
| 2019/0361454 A1* | 11/2019 | Zeng | G05D 1/0274 |
| 2019/0361456 A1* | 11/2019 | Zeng | B60W 30/00 |
| 2020/0034645 A1* | 1/2020 | Fan | G06N 20/00 |

* cited by examiner

LEARNING METHOD AND LEARNING DEVICE FOR SWITCHING MODES OF AUTONOMOUS VEHICLE BASED ON ON-DEVICE STANDALONE PREDICTION TO THEREBY ACHIEVE SAFETY OF AUTONOMOUS DRIVING, AND TESTING METHOD AND TESTING DEVICE USING THE SAME

CROSS REFERENCE OF RELATED APPLICATION

This application claims the benefit of priority to U.S. Provisional Patent Application No. 62/798,676, filed Jan. 30, 2019, the entire contents of which are incorporated herein by reference.

FIELD OF THE DISCLOSURE

The present disclosure relates to a learning method and a learning device for use with an autonomous vehicle; and more particularly, to the learning method and the learning device for switching modes of an autonomous vehicle based on an on-device standalone prediction to thereby achieve safety of an autonomous driving, and a testing method and a testing device using the same.

BACKGROUND OF THE DISCLOSURE

Recently, an autonomous driving technology has been studied, so that an autonomous vehicle could be driven with a fairly high accuracy without an intervention of a driver. However, such autonomous driving technology may not work well in certain situations. For example, in case of a camera-based autonomous vehicle, if a field of view of a camera installed on the autonomous vehicle suddenly becomes dark, images acquired by the camera may not be appropriate for an autonomous driving, therefore the camera-based autonomous vehicle may not work properly.

In such a case, the autonomous driving should be stopped and the vehicle should be switched to a manual driving mode so that a driver is allowed to drive the vehicle manually. As a conventional technique, there has been a method for notifying the driver of a warning by using a geographic zones database which is a database including information on whether each of sections is safe for the vehicle to be driven autonomously or not.

A shortcoming of this prior art is that a manual driving may be required even in a section which was labelled as safe for the autonomous driving in the geographic zones database as the case may be. For example, in case a weather is extremely bad or a street light is broken at night, whether the vehicle should be driven autonomously or not cannot be determined properly by using a passively updated database like the geographic zones database. That is, a problem of the prior art is that it is difficult to deal with such a case.

SUMMARY OF THE DISCLOSURE

It is an object of the present disclosure to solve all the aforementioned problems.

It is an object of the present disclosure to provide a learning method for switching modes of an autonomous vehicle based on an on-device standalone prediction, to thereby achieve a safety of an autonomous driving.

It is another object of the present disclosure to provide a method for generating parameters capable of representing a degree of credibility of an object detection during a process of the object detection.

It is still another object of the present disclosure to provide a loss to be used for training a network for the object detection to generate the parameters while properly performing the object detection.

In accordance with one aspect of the present disclosure, there is provided a learning method for generating parameters capable of representing a degree of credibility of an object detection during a process of the object detection, including steps of: (a) a learning device, if a training image is acquired, instructing at least one convolutional layer included in a Convolutional Neural Network (CNN) to generate at least one convolutional feature map by applying at least one convolutional operation to the training image; (b) the learning device, during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores; (c) the learning device, if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (d) the learning device instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN.

As one example, at the step of (d), the learning device instructs the loss layer to generate the RPN loss by using a following formula:

$$L_{RPN}(\{p_i\}, \{t_i\}) = \frac{1}{N_{cls}}\left(\sum_{i:p_i^*=I(p_i>0.5)}(1.1-c_i)L_{cls}(p_i, p_i^*) + \sum_{i:p_i^*\neq I(p_i>0.5)}(0.1+c_i)\right.$$
$$\left.L_{cls}(p_i, p_i^*) + \sum_i c_i \log c_i\right) + \lambda\frac{1}{N_{reg}}\sum_i p_i^* L_{reg}(t_i, t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding thereto, $t_i$ denotes an i-th estimated RPN regression result corresponding to the i-th pixel, and $t_i^*$ denotes an i-th GT RPN regression result corresponding thereto, and wherein, the i-th GT RPN classification result and the i-th GT RPN regression result correspond to the GT object detection result.

As one example, at the step of (d), the learning device instructs the loss layer to generate the CNN loss by using a following formula:

$$L_{CNN}(\{p_i\}, \{t_i\}) = \frac{1}{N_{cls}}\left(\sum_{i:p_i^* = I(p_i = \text{largest score among class scores})}(1.1 - c_i)L_{cls}(p_i, p_i^*) + \sum_{i:p_i^* \neq I(p_i = \text{largest score among class scores})}(0.1 + c_i)L_{cls}(p_i, p_i^*) + \sum_i c_i \log c_i\right) + \lambda \frac{1}{N_{reg}}\sum_i p_i^* L_{reg}(t_i, t_i^*)$$

wherein $N_{reg}$ and $N_{cls}$ denote the number of the estimated ROIs, $c_i$ denotes an i-th CNN confidence score, corresponding to an i-th estimated ROI selected from the estimated ROIs, among the CNN confidence scores, $p_i$ denotes an i-th estimated CNN classification result corresponding to the i-th estimated ROI, $p_i^*$ denotes an i-th GT CNN classification result corresponding thereto, $t_i$ denotes an i-th estimated CNN regression results corresponding to the i-th estimated ROI, and $t_i^*$ denotes an i-th GT CNN regression result corresponding thereto, and wherein the i-th estimated CNN classification result and the i-th estimated CNN regression result correspond to the estimated object detection result.

As one example, after the step of (c), the learning device instructs a confidence layer to generate an integrated confidence map including information on each of integrated confidence scores for each of pixels in the training image by referring to the RPN confidence map and the CNN confidence map.

As one example, the learning device instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

As one example, the learning device instructs the confidence layer to generate a (X_Y)-th integrated confidence score, corresponding to a coordinate (x, y) on the training image, among the integrated confidence scores, by using a following formula:

$$c'_{xy} = \max\left(c_{xy}, \max_{r_i : (x,y) \in r_i} c_{r_i}\right)$$

wherein $c'_{xy}$ denotes the (X_Y)-th integrated confidence score, $c_{xy}$ denotes a (X_Y)-th resized RPN confidence score corresponding to a coordinate (x, y) on the resized RPN confidence map, and $c_{r_i}$ denotes an i-th CNN confidence score for an i-th estimated ROI, denoted as $r_i$, including the coordinate (x, y), which has been determined in the NMS result.

In accordance with another aspect of the present disclosure, there is provided a testing method for generating parameters capable of representing a degree of credibility of an object detection during a process of the object detection, including steps of: (a) on condition that (1) a learning device has instructed at least one convolutional layer included in a Convolutional Neural Network (CNN) to generate at least one convolutional feature map for training by applying at least one convolutional operation to a training image; (2) the learning device, during a process of generating estimated Regions-Of-Interest (ROIs) for training on the training image by applying at least one anchor operation to the convolutional feature map for training, has instructed at least one anchor layer included in a Region Proposal Network (RPN) to generate each of one or more RPN confidence scores for training for each of pixels in the convolutional feature map for training, representing each of one or more probabilities for training of the estimated ROIs for training being same as Ground-Truth (GT) ROIs, to thereby generate an RPN confidence map for training including the RPN confidence scores for training; (3) the learning device, if at least one ROI-Pooled feature map for training is acquired, which has been generated by using the convolutional feature map for training and the estimated ROIs for training through an ROI pooling layer included in the CNN, during a process of generating an estimated object detection result for training by using the ROI-Pooled feature map for training, has instructed an FC layer included in the CNN to generate each of CNN confidence scores for training for each of the estimated ROIs for training, representing each of one or more probabilities for training of each of one or more estimated CNN classification results for training and each of one or more estimated CNN regression results for training included in the estimated object detection result for training being same as each of one or more GT CNN classification results and each of one or more GT CNN regression results included in a GT object detection result, to thereby generate a CNN confidence map for training including the CNN confidence scores for training; and (4) the learning device has instructed a loss layer to generate at least one RPN loss and at least one CNN loss by referring to the RPN confidence map for training, the CNN confidence map for training, the estimated object detection result for training and the GT object detection result, and perform backpropagation by using the RPN loss and the CNN loss to learn at least part of parameters in the CNN and the RPN, a testing device, if a test image, corresponding to an N-th frame of a driving video for testing, is acquired, instructing the convolutional layer included in the CNN to generate at least one convolutional feature map for testing by applying the convolutional operation to the test image; (b) the testing device, during a process of generating estimated ROIs for testing on the test image by applying the anchor operation to the convolutional feature map for testing, instructing the anchor layer included in the RPN to generate each of one or more RPN confidence scores for testing for each of pixels in the convolutional feature map for testing, representing each of one or more probabilities for testing of the estimated ROIs for testing being same as Ground-Truth (GT) ROIs, to thereby generate an RPN confidence map for testing including the RPN confidence scores for testing; (c) the testing device, if at least one ROI-Pooled feature map for testing is acquired, which has been generated by using the convolutional feature map for testing and the estimated ROIs for testing through the ROI pooling layer included in the CNN, during a process of generating an estimated object detection result for testing by using the ROI-Pooled feature map for testing, instructing the FC layer included in the CNN to generate each of CNN confidence scores for testing for each of the estimated ROIs for testing, representing each of one or more probabilities for testing of each of one or more estimated CNN classification results for testing and each of one or more estimated CNN regression results for testing included in the estimated object detection result for testing being same as each of one or more GT CNN classification results and each of one or more GT CNN regression results included in a GT object detection result, to thereby generate a CNN confidence map for testing including the CNN confidence scores for testing; and (d) the testing device instructing a confidence layer to generate an integrated confidence map for testing including integrated confidence scores for testing by referring to the RPN confidence map for testing and the CNN confidence map for testing.

As one example, the testing device instructs the confidence layer to perform (i-1) a process of acquiring a Non-Maximum Suppression (NMS) result on the estimated ROIs for testing generated during a process of generating the estimated object detection result for testing, from the CNN, (i-2) a process of generating a resized RPN confidence map for testing by applying at least one resizing operation to the RPN confidence map for testing, and (ii) a process of generating the integrated confidence map for testing by referring to the NMS result for testing and the resized RPN confidence map for testing.

As one example, the testing device instructs the confidence layer to generate a (X_Y)-th integrated confidence score for testing, corresponding to a coordinate (x, y) on the test image, among the integrated confidence scores for testing, by using a following formula:

$$c'_{xy} = \max(c_{xy}, \max_{r_i:(x,y)\in r_i} c_{r_i})$$

wherein $c_{xy}'$ denotes the (X_Y)-th integrated confidence score for testing, $c_{xy}$ denotes a (X_Y)-th resized RPN confidence score for testing corresponding to a coordinate (x, y) on the resized RPN confidence map for testing, and $c_{r_i}$ denotes an i-th CNN confidence score for testing for an i-th estimated ROI for testing, denoted as $r_i$, including the coordinate (x, y), which has been determined in the NMS result for testing.

As one example, the method further includes a step of: (e) the testing device, if route information representing a scheduled route to be driven by a testing vehicle during a prescribed time range from a timing corresponding to the N-th frame, which has been generated by a route planning module interworking with the testing vehicle, is acquired, instructing a mode switching module to (i) select at least one N-th target confidence score for the N-th frame, corresponding to the scheduled route by referring to the integrated confidence map for testing and the route information, among the integrated confidence scores for testing, and (ii) determine whether the N-th target confidence score is larger than a threshold or not.

As one example, the testing device instructs the mode switching module to change a driving mode of the testing device from an autonomous driving mode to a manual driving mode, if (i) the N-th target confidence score is smaller than or equal to the threshold and (ii) at least part of an (N−K)-th target confidence score to an (N−1)-th target confidence score, each corresponding to an (N−K)-th frame to an (N−1)-th frame, are smaller than or equal to the threshold, wherein K is an arbitrary integer smaller than N.

As one example, the testing device instructs the mode switching module to change a driving mode of the testing device from an autonomous driving mode to a manual driving mode, if (i) the N-th target confidence score is smaller than or equal to the threshold and (ii) an (N−K)-th target confidence score to an (N−1)-th target confidence score, each corresponding to an (N−K)-th frame to an (N−1)-th frame, are decreasing in order, wherein K is an arbitrary integer smaller than N.

In accordance with still another aspect of the present disclosure, there is provided a learning device for generating parameters capable of representing a degree of credibility of an object detection during a process of the object detection, including: at least one memory that stores instructions; and at least one processor configured to execute the instructions to perform processes of: (I) if a training image is acquired, instructing at least one convolutional layer included in a Convolutional Neural Network (CNN) to generate at least one convolutional feature map by applying at least one convolutional operation to the training image; (II) during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores; (III) if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (IV) instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN.

As one example, at the process of (IV), the processor instructs the loss layer to generate the RPN loss by using a following formula:

$$L_{RPN}(\{p_i\}, \{t_i\}) = \frac{1}{N_{cls}}$$

-continued $$\left(\sum_{i:p_i^*=I(p_i>0.5)}(1.1-c_i)L_{cls}(p_i,p_i^*)+\sum_{i:p_i^*\neq I(p_i>0.5)}(0.1+c_i)L_{cls}(p_i,p_i^*)+\sum_i c_i\log c_i\right)+\lambda\frac{1}{N_{reg}}\sum_i p_i^*L_{reg}(t_i,t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding thereto, $t_i$ denotes an i-th estimated RPN regression result corresponding to the i-th pixel, and $t_i^*$ denotes an i-th GT RPN regression result corresponding thereto, and wherein, the i-th GT RPN classification result and the i-th GT RPN regression result correspond to the GT object detection result.

As one example, at the process of (IV), the processor instructs the loss layer to generate the CNN loss by using a following formula:

$$L_{CNN}(\{p_i\},\{t_i\})=\frac{1}{N_{cls}}\left(\sum_{i:p_i^*=I(p_i=\text{largest score among class scores})}(1.1-c_i)L_{cls}(p_i,p_i^*)+\sum_{i:p_i^*\neq I(p_i=\text{largest score among class scores})}(0.1+c_i)L_{cls}(p_i,p_i^*)+\sum_i c_i\log c_i\right)+\lambda\frac{1}{N_{reg}}\sum_i p_i^*L_{reg}(t_i,t_i^*)$$

wherein $N_{reg}$ and $N_{cls}$ denote the number of the estimated ROIs, $c_i$ denotes an i-th CNN confidence score, corresponding to an i-th estimated ROI among the estimated ROIs, among the CNN confidence scores, $p_i$ denotes an i-th estimated CNN classification result corresponding to the i-th estimated ROI, $p_i^*$ denotes an i-th GT CNN classification result corresponding thereto, $t_i$ denotes an i-th estimated CNN regression result corresponding to the i-th estimated ROI, and $t_i^*$ denotes an i-th GT CNN regression result corresponding thereto, and wherein the i-th estimated CNN classification result and the i-th estimated CNN regression result correspond to the estimated object detection result.

As one example, after the process of (III), the processor instructs a confidence layer to generate an integrated confidence map including information on each of integrated confidence scores for each of pixels in the training image by referring to the RPN confidence map and the CNN confidence map.

As one example, the processor instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

As one example, the processor instructs the confidence layer to generate a (X_Y)-th integrated confidence score, corresponding to a coordinate (x, y) on the training image, among the integrated confidence scores, by using a following formula:

$$c'_{xy}=\max\left(c_{xy},\max_{r_i:(x,y)\in r_i}c_{r_i}\right)$$

wherein $c'_{xy}$ denotes the (X_Y)-th integrated confidence score, $c_{xy}$ denotes a (X_Y)-th resized RPN confidence score corresponding to a coordinate (x, y) on the resized RPN confidence map, and $c_{r_i}$ denotes an i-th CNN confidence score for an i-th estimated ROI, denoted as $r_i$, including the coordinate (x, y), which has been determined in the NMS result.

In accordance with still yet another aspect of the present disclosure, there is provided a testing device for generating parameters capable of representing a degree of credibility of an object detection during a process of the object detection, including: at least one memory that stores instructions; and at least one processor configured to execute the instructions to perform processes of: (I) on condition that (1) a learning device has instructed at least one convolutional layer included in a Convolutional Neural Network (CNN) to generate at least one convolutional feature map for training by applying at least one convolutional operation to a training image; (2) the learning device, during a process of generating estimated Regions-Of-Interest (ROIs) for training on the training image by applying at least one anchor operation to the convolutional feature map for training, has instructed at least one anchor layer included in a Region Proposal Network (RPN) to generate each of one or more RPN confidence scores for training for each of pixels in the convolutional feature map for training, representing each of one or more probabilities for training of the estimated ROIs for training being same as Ground-Truth (GT) ROIs, to thereby generate an RPN confidence map for training including the RPN confidence scores for training; (3) the learning device, if at least one ROI-Pooled feature map for training is acquired, which has been generated by using the convolutional feature map for training and the estimated ROIs for training through an ROI pooling layer included in the CNN, during a process of generating an estimated object detection result for training by using the ROI-Pooled feature map for training, has instructed an FC layer included in the CNN to generate each of CNN confidence scores for training for each of the estimated ROIs for training, representing each of one or more probabilities for training of each of one or more estimated CNN classification results for training and each of one or more estimated CNN regression results for training included in the estimated object detection result for training being same as each of one or more GT CNN classification results and each of one or more GT CNN regression results included in a GT object detection result, to thereby generate a CNN confidence map for training including the CNN confidence scores for training; and (4) the learning device has instructed a loss layer to generate at least one RPN loss and at least one CNN loss by referring to the RPN confidence map for training, the CNN confidence map for training, the estimated object detection result for training and the GT object detection result, and perform backpropagation by using the RPN loss and the CNN loss to learn at least part of parameters in the CNN and the RPN, if a test image, corresponding to an N-th frame of a driving video for testing, is acquired, instructing the convolutional layer included in the CNN to generate at least one convolutional feature map for testing by applying the convolutional operation to the test image; (II) during a process of generating estimated ROIs for testing on the test image by applying the anchor operation to the convolutional feature map for testing, instructing the anchor layer included in the RPN to generate each of one or more RPN confidence scores for testing for each of pixels in the convolutional feature map for testing, representing each of one or more probabilities for testing of the estimated ROIs for testing being same as Ground-Truth (GT) ROIs, to thereby generate an RPN confidence map for testing including the RPN confidence scores for testing; (III) if at least one ROI-Pooled feature map for testing is acquired, which has been generated by using the convolutional feature map for testing and the estimated ROIs for testing through the ROI pooling layer included in the CNN, during a process of generating an estimated object detection result for testing by using the ROI-Pooled feature map for testing, instructing the FC layer included in the CNN to generate each of CNN confidence scores for testing for each of the estimated ROIs for testing, representing each of one or more probabilities for testing of each of one or more estimated CNN classification results for testing and each of one or more estimated CNN regression results for testing included in the estimated object detection result for testing being same as each of one or more GT CNN classification results and each of one or more GT CNN regression results included in a GT object detection result, to thereby generate a CNN confidence map for testing including the CNN confidence scores for testing; and (IV) instructing a confidence layer to generate an integrated confidence map for testing including integrated confidence scores for testing by referring to the RPN confidence map for testing and the CNN confidence map for testing.

As one example, the processor instructs the confidence layer to perform (i-1) a process of acquiring a Non-Maximum Suppression (NMS) result on the estimated ROIs for testing generated during a process of generating the estimated object detection result for testing, from the CNN, (i-2) a process of generating a resized RPN confidence map for testing by applying at least one resizing operation to the RPN confidence map for testing, and (ii) a process of generating the integrated confidence map for testing by referring to the NMS result for testing and the resized RPN confidence map for testing.

As one example, the processor instructs the confidence layer to generate a (X_Y)-th integrated confidence score for testing, corresponding to a coordinate (x,y) on the test image, among the integrated confidence scores for testing, by using a following formula:

$$c'_{xy} = \max\left(c_{xy}, \max_{r_i:(x,y)\in r_i} c_{r_i}\right)$$

wherein $c_{xy}'$ denotes the (X_Y)-th integrated confidence score for testing, $c_{xy}$ denotes a (X_Y)-th resized RPN confidence score for testing corresponding to a coordinate (x,y) on the resized RPN confidence map for testing, and $c_{r_i}$ denotes an i-th CNN confidence score for testing for an i-th estimated ROI for testing, denoted as $r_i$, including the coordinate (x, y), which has been determined in the NMS result for testing.

As one example, the processor further performs a process of: (V) if route information representing a scheduled route to be driven by a testing vehicle during a prescribed time range from a timing corresponding to the N-th frame, which has been generated by a route planning module interworking with the testing vehicle, is acquired, instructing a mode switching module to (i) select at least one N-th target confidence score for the N-th frame, corresponding to the scheduled route by referring to the integrated confidence map for testing and the route information, among the integrated confidence scores for testing, and (ii) determine whether the N-th target confidence score is larger than a threshold or not.

As one example, the processor instructs the mode switching module to change a driving mode of the testing device from an autonomous driving mode to a manual driving mode, if (i) the N-th target confidence score is smaller than or equal to the threshold and (ii) at least part of an (N-K)-th target confidence score to an (N-1)-th target confidence score, each corresponding to an (N-K)-th frame to an (N-1)-th frame, are smaller than or equal to the threshold, wherein K is an arbitrary integer smaller than N.

As one example, the processor instructs the mode switching module to change a driving mode of the testing device from an autonomous driving mode to a manual driving mode, if (i) the N-th target confidence score is smaller than or equal to the threshold and (ii) an (N-K)-th target confidence score to an (N-1)-th target confidence score, each corresponding to an (N-K)-th frame to an (N-1)-th frame, are decreasing in order, wherein K is an arbitrary integer smaller than N.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
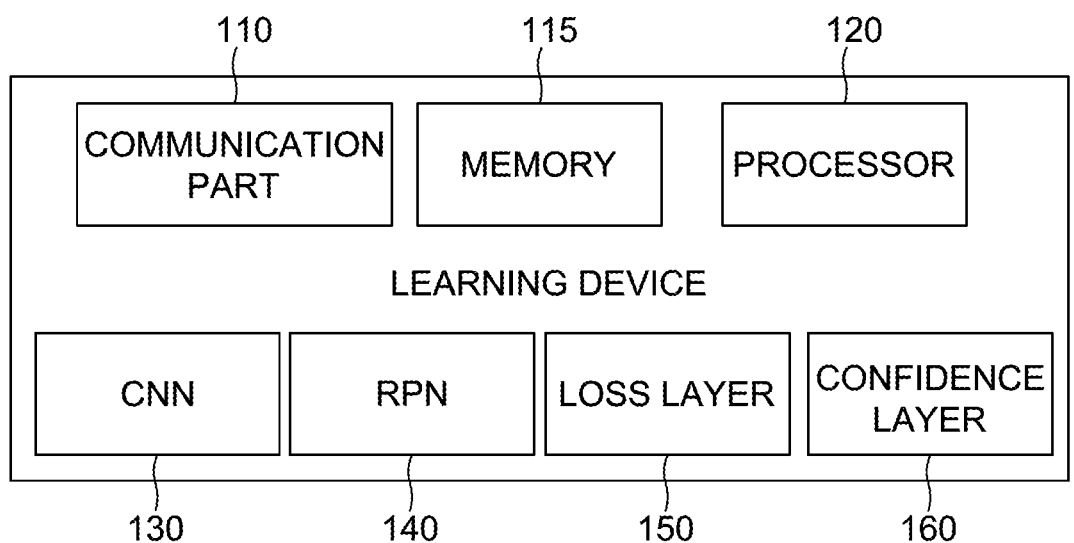
FIG. 1 is a drawing schematically illustrating a configuration of a learning device performing a learning method for switching modes of an autonomous vehicle based on an on-device standalone prediction to thereby achieve safety of an autonomous driving in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a learning device 100 performing a learning method for switching modes of an autonomous vehicle based on an on-device standalone prediction to thereby achieve safety of an autonomous driving in accordance with one example embodiment of the present disclosure.

By referring to FIG. 1, the learning device 100 may include a Convolutional Neural Network (CNN) 130, a Region Proposal Network (RPN) 140, a loss layer 150 and a confidence layer 160, to be described later. Processes of input/output and computations of the CNN 130, the RPN 140, the loss layer 150 and the confidence layer 160 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

The above description shows the configuration of the learning device 100 performing the learning method for switching the modes of the autonomous vehicle based on the on-device standalone prediction to thereby achieve the safety of the autonomous driving in accordance with one example embodiment of the present disclosure. And the learning method is described by referring to FIG. 2 as below.

Figure 2:
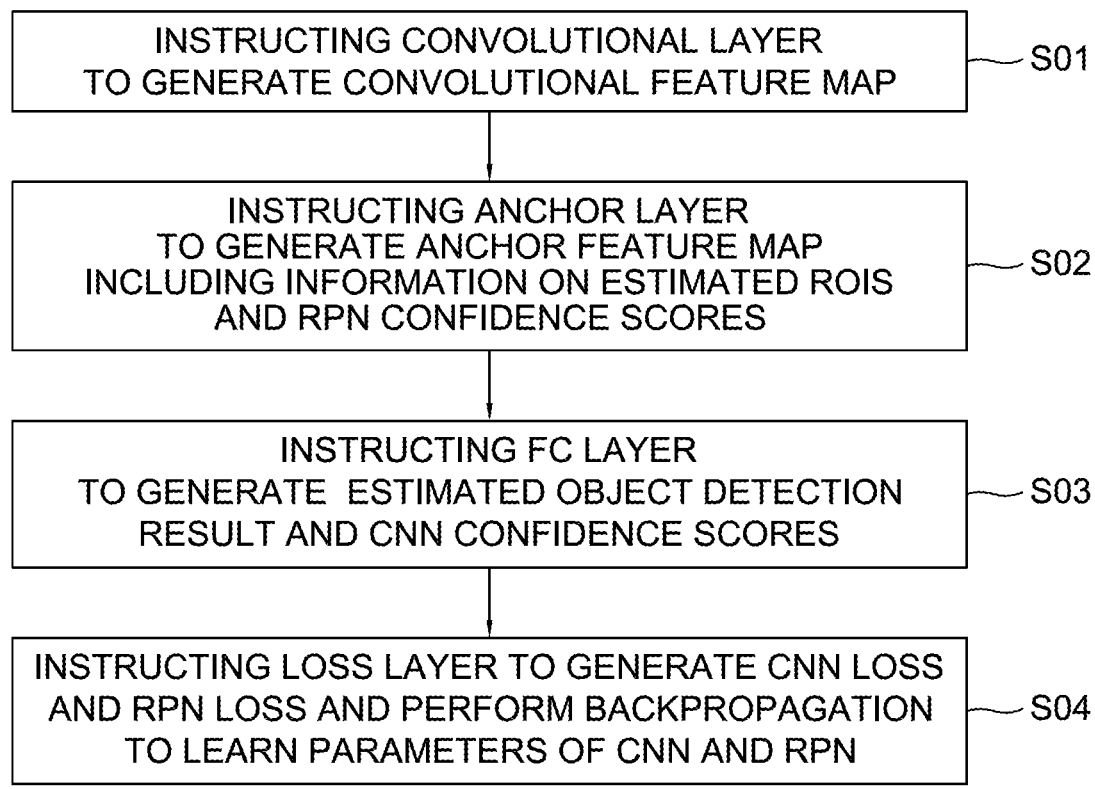
FIG. 2 is a drawing schematically illustrating a flow of the learning method for switching the modes of the autonomous vehicle based on the on-device standalone prediction to thereby achieve the safety of the autonomous driving in accordance with one example embodiment of the present disclosure.

FIG. 2 is a drawing schematically illustrating a flow of the learning method for switching the modes of the autonomous vehicle based on the on-device standalone prediction to thereby achieve the safety of the autonomous driving in accordance with one example embodiment of the present disclosure.

By referring to FIG. 2, the learning method for generating each of confidence scores, which are parameters representing degrees of credibility of an object detection during a process of the object detection, can be seen briefly.

For reference, in the description below, the phrase "for training" or "training" is added for terms related to the learning process, and the phrase "for testing" or "testing" is added for terms related to the testing process, to avoid possible confusion.

First, at a step of S01, if a training image is acquired, the learning device 100 may instruct a convolutional layer included in the CNN 130 to apply at least one convolutional operation to the training image, to generate at least one convolutional feature map. Herein, in case a geometric size of the training image may be H×W, and a format of the training image is an RGB format so that a channel size of the training image is 3, a data size of the training image may be H×W×3. Since the convolutional operation allows a geometric size of its outputted feature map to be smaller than that of its inputted image, and a channel size of its outputted feature map larger than that of its inputted image, h and w, denoting the geometric size of the convolutional feature map, may be smaller than H and W respectively, and c, denoting the channel size thereof, may be larger than 3, if the size of the convolutional feature map is h×w×c.

Thereafter, at a step of S02, the learning device 100 may instruct an anchor layer in the RPN 140 to output estimated Regions-Of-Interest (ROIs), which are regions expected to include objects in the training image, by applying an anchor operation to values included in the convolutional feature map. Specifically, the RPN 140 may generate an anchor feature map whose data size is h×w×(5A+1), to be used for generating the estimated ROIs on the training image, by applying the anchor operation to the convolutional feature map whose data size is h×w×c. By according to a prior art, the data size of the anchor feature map should have been h×w×5A, but, the anchor feature map in accordance with the present disclosure may include one more channel to include RPN confidence scores to be explained later. A more specific explanation on this will be presented below.

The learning device 100 may instruct the anchor layer of the RPN 140 to generate the anchor feature map whose data size is h×w×5A by applying the anchor operation to the convolutional feature map, where the anchor operation uses sliding-windows each of which corresponds to each set of anchors. Herein, the anchors may be a sort of grids for selecting values of the convolutional feature map corresponding to the objects, and the above-mentioned A, used for representing the data size of the anchor feature map, may denote the number of the anchors used by the RPN 140. By performing this process, whether each of values included in the convolutional feature map corresponds to the objects or not may be determined, and a result of this process, e.g., information on estimated ROIs, may be stored in the anchor feature map. Since the anchor operation is a well-known prior art, more specific explanation will be omitted.

During the process of generating the anchor feature map, the learning device 100 may instruct the RPN 140 to generate each of the RPN confidence scores for each of pixels included in the convolutional feature map, representing each of one or more probabilities of the estimated ROIs being same as Ground-Truth (GT) ROIs. To be simple, the RPN confidence scores are parameters indicating degrees of the credibility of the results, e.g., the estimated ROIs, of the process performed by the RPN 140.

Above, the process of determining the estimated ROIs and the process of generating the RPN confidence scores have been explained separately for convenience, but the two processes may be performed at the same time. That is, as the convolutional feature map is inputted to the RPN 140, each of RPN neurons in the RPN 140 may perform its operations and deliver its operated value to its next RPN neuron, to thereby output the anchor feature map from a final layer of the RPN 140. Thus, the two processes may be performed, dependently affecting each other. However, those two processes may be performed not at the same time. For example, the process of determining the estimated ROIs may be performed first.

After the anchor feature map is generated, the learning device 100 may deliver values of 5A channels therein, including information on the estimated ROIs, to the CNN 130, and deliver values of remaining one channel therein to the confidence layer 160 to be explained later. First, how the values of the 5A channels delivered to the CNN 130 are processed will be explained below.

After said values of the 5A channels are delivered, the learning device 100 may instruct an ROI pooling layer in the CNN 130 to apply at least one ROI pooling operation to the convolutional feature map in order to generate an ROI-pooled feature map by referring to the information on the estimated ROIs, and, at a step of S03, may instruct an FC layer included in the CNN 130 to apply at least one FC operation to the ROI-pooled feature map, to thereby generate an initial object detection result and CNN confidence scores.

Herein, the initial object detection result may include each of one or more estimated CNN regression results on each of estimated coordinates of each of bounding boxes including each of the objects, and each of one or more estimated CNN classification results on each of class scores of each of the objects, representing each of probabilities of each of the objects being included in each of classes. Such process of generating the initial object detection result is a well-known prior art.

And, the CNN confidence scores may include information on degrees of an estimated object detection result being same as a GT object detection result, to be explained later. Herein, the estimated object detection result may have been generated by applying Non-Maximum Suppression (NMS) operation to the initial object detection result. Specifically, each of the CNN confidence scores may represent each of one or more probabilities of each of the one or more estimated CNN classification results and each of the one or more estimated CNN regression results included in the estimated object detection result being same as each of one or more GT CNN classification results and each of one or more GT CNN regression results included in the GT object detection result. To be simple, the CNN confidence scores may represent degrees of credibility on results generated by the FC layer of the CNN 130.

The reason why the CNN confidence scores and the RPN confidence scores are both used is that estimated ROIs initially determined by the RPN 140 are processed by the CNN 130 later, in order to generate the estimated object detection result. Since the two networks both involve in the processes of generating the estimated object detection result, thus the two networks should be evaluated differently.

For example, even in case a specific estimated ROI is wrongly determined by the RPN 140, the FC layer of the CNN 130 may be able to filter the specific estimated ROI which has been wrongly determined. Or, even in case the specific estimated ROI is determined properly by the RPN 140, the FC layer of the CNN 130 may wrongly determine that the specific estimated ROI does not include any objects. As can be seen in such cases, the RPN 140 and the CNN 130 may perform wrongly or properly, thus such cases should be considered during evaluating the object detection process.

Similar to the RPN 140, (i) the process of generating the initial object detection result and its corresponding estimated object detection result and (ii) the process of generating the CNN confidence map have been explained separately for convenience, but those two processes may be performed by the FC layer at the same time, dependently to each other. However, those two processes may be performed independently.

After such CNN confidence scores are generated for the estimated ROIs, a CNN confidence map including the CNN confidence scores may be generated.

Thereafter, the learning device 100 may instruct the CNN 130 to integrate bounding boxes corresponding to overlapped estimated ROIs by applying the NMS to the initial object detection result, to thereby generate the estimated object detection result. As the overlapped ones are integrated, specific CNN confidence scores corresponding to specific estimated ROIs, which have not been overlapped to other estimated ROIs, may be selected. Herein, such usage of the NMS is a well-known prior art, thus more specific explanation is omitted.

Meanwhile, the learning device 100 may instruct the confidence layer 160 to acquire values of the one channel in the anchor feature map, which correspond to the RPN confidence map, and generate a resized RPN confidence map whose geometric size is H×W, same as the training image, by using the RPN confidence map. In order to generate the resized RPN confidence map, any of resizing operations, e.g., Nearest Neighbor Size, Bilinear Resize, Bicubic Resize or Lanczos Resize, may be applied to the RPN confidence map, to pair each of the RPN confidence scores with each of pixels in the training image.

After the estimated object detection result and the resized RPN confidence map are acquired, the learning device 100 may instruct the confidence layer 160 to generate an integrated confidence map by referring thereto. Herein, integrated confidence scores included in the integrated confidence map may be calculated by using a following formula:

$$c'_{xy} = \max\left(c_{xy}, \max_{r_i:(x,y)\in r_i} c_{r_i}\right)$$

Herein, $c'_{x\_y}$ may denote a (X_Y)-th integrated confidence score and $c_{xy}$ may denote a (X_Y)-th resized RPN confidence score corresponding to a coordinate (x,y) on the resized RPN confidence map. Also, $c_{r_i}$ may denote an i-th CNN confidence score for an i-th estimated ROI, denoted as $r_i$, including the coordinate (x,y), which has been determined in the NMS result. The learning device 100 may instruct the confidence layer 160 to generate the integrated confidence map by using the integrated confidence scores generated as shown above.

In order to generate the integrated confidence map properly, the CNN 130 and the RPN 140 should be trained. Below how the two networks can be trained will be presented.

That is, at a step of S04, the learning device 100 may instruct the loss layer 150 to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN 130 and the RPN 140. Below, how to generate the RPN loss and the CNN loss will be explained.

First, the RPN loss can be generated by using a following formula:

$$L_{RPN}(\{p_i\}, \{t_i\}) = \frac{1}{N_{cls}}$$

$$\left(\sum_{i:p_i^*=I(p_i>0.5)} (1.1-c_i)L_{cls}(p_i, p_i^*) + \sum_{i:p_i^* \neq I(p_i>0.5)} (0.1+c_i)L_{cls}(p_i, p_i^*) +\right.$$

$$\left.\sum_i c_i \log c_i\right) + \lambda \frac{1}{N_{reg}} \sum_i p_i^* L_{reg}(t_i, t_i^*)$$

Herein, $N_{reg}$ may denote a constant corresponding to a size of the convolutional feature map generated by performing the anchor operation, and $N_{cls}$ may denote a constant corresponding to the training image. Also, $c_i$ may denote an i-th RPN confidence score corresponding to an i-th pixel of the convolutional feature map, among the RPN confidence scores, $p_i$ may denote an i-th estimated RPN classification result corresponding to the i-th pixel, and $p_i^*$ may denote an i-th GT RPN classification result corresponding thereto. And, $t_i$ may denote an i-th estimated RPN regression result corresponding to the i-th pixel, and $t_i^*$ may denote an i-th GT RPN regression result corresponding thereto. The i-th GT RPN classification result and the i-th GT RPN regression result may correspond to the GT object detection result. Also, $L_{cls}$ and $L_{reg}$ may be implemented by using any of prior arts for generating losses, e.g., smooth-L1 loss.

In the formula, a first term of the formula may denote a classification loss, and a second one may denote a regression loss. The regression loss term, i.e., the second term, is a well-known prior art, thus further explanation is omitted. Below, the classification loss term, i.e., the first term will be explained.

The classification loss term may include three sub-terms in a parenthesis as shown above. In the first sub-term thereof, a condition i: $p_i^*=I(p_i>0.5)$ represents a case that the i-th estimated RPN classification result, determined by the RPN 140, corresponding to the i-th pixel of the anchor feature map, is same as the i-th GT RPN classification result. To be simple, it represents a case that the RPN 140 has analyzed the i-th pixel of the convolutional feature map correctly. Herein, it is assumed that the RPN 140 has analyzed the i-th pixel "correctly", if the RPN 140 has determined the i-th estimated RPN classification result to be same as the i-th GT RPN classification result with a probability larger than a threshold probability, herein 0.5 for convenience. In the first sub-term, $(1.1-c_i)$ allows the i-th RPN confidence score to be larger when the RPN 140 has analyzed the i-th pixel correctly, since parameters of the RPN 140 are adjusted to make the RPN loss smaller. Specifically, the classification loss term including the first sub-term generated as shown above is referred to, in order to generate gradients for allowing the parameters of the RPN 140 to be adjusted, to thereby allow a future RPN loss to be smaller. Thus, by using the classification loss term including the first sub-term, the RPN 140 may generate larger RPN confidence scores in case the RPN 140 analyzes the values of the convolutional feature map correctly.

In the second sub-term of the classification loss term, a condition i: $p_i^* \neq I(p_i>0.5)$ represents a case that the RPN 140 has analyzed the i-th pixel incorrectly. In the second sub-term, $(0.1+c_i)$ allows the i-th RPN confidence score to be smaller when the RPN 140 has analyzed the i-th pixel incorrectly. A mechanism of such training processes may be same as that of the first sub-term.

In the third sub-term, $c_i \log c_i$ allows a distribution of the RPN confidence scores not to be similar to that of a step function. If the classification loss term only includes the first sub-term and the second sub-term, the RPN confidence scores may be overfitted so that those may include only extreme values close to 0 or 1. Herein, $c_i \log c_i$ is the smallest when $c_i$ is 0.5. Thus, the distribution of the RPN confidence scores in accordance with the present disclosure may be more diverse, including various values between 0 and 1. Since various situations can be dealt with by using the RPN confidence scores including the various values as shown above, this term is necessary.

Since the RPN loss in accordance with the present disclosure have been explained above, the CNN loss will be presented below.

$$L_{CNN}(\{p_i\}, \{t_i\}) =$$

$$\frac{1}{N_{cls}} \left( \sum_{i: p_i^* = I(p_i = \text{largest score among class scores})} (1.1 - c_i) L_{cls}(p_i, p_i^*) + \right.$$

$$\sum_{i: p_i^* \neq I(p_i = \text{largest score among class scores})} (0.1 + c_i) L_{cls}(p_i, p_i^*) +$$

$$\left. \sum_i c_i \log c_i \right) + \lambda \frac{1}{N_{reg}} \sum_i p_i^* L_{reg}(t_i, t_i^*)$$

Herein $N_{reg}$ and $N_{cls}$ may denote the number of the estimated ROIs, and $c_i$ may denote an i-th CNN confidence score, corresponding to an i-th estimated ROI among the estimated ROIs, among the CNN confidence scores. Also, $p_i$ may denote an i-th estimated CNN classification result corresponding to the i-th estimated ROI, and $p_i^*$ may denote an i-th GT CNN classification result corresponding thereto. And, $t_i$ may denote an i-th estimated CNN regression result corresponding to the i-th estimated ROI, and $t_i^*$ may denote an i-th GT CNN regression result corresponding thereto. The i-th estimated CNN classification result and the i-th estimated CNN regression result may correspond to the estimated object detection result. In this formula, notations may be same as that of the RPN loss, but it may be different as shown above.

As can be seen in the formula above, the CNN loss may be similar to the RPN loss, except their conditions of sigma functions. Herein, the conditions on $p_i$ include $p_i$=largest score among class scores, not $p_i$>0.5 as the RPN loss. Such conditions may represent that $p_i$ is related to the i-th estimated CNN classification result on a specific class whose probability of including a specific object in the i-th estimated ROI is the largest. Similar to the RPN loss, a first sub-term of a classification loss term in the CNN loss may represent a case that the CNN 130 has analyzed the i-th estimated ROI correctly, and the second sub-term may represent another case that the CNN 130 has analyzed the i-th estimated ROI incorrectly. The CNN loss and the RPN loss are similar to each other, thus further explanation is omitted.

After the CNN loss and the RPN loss are generated as shown above, the learning device 100 may instruct the loss layer 150 to learn at least part of parameters included in the CNN 130 and the RPN 140 by performing backpropagation using the CNN loss and the RPN loss respectively. Thereafter, while the CNN 130 and the RPN 140 perform processes of detecting objects included in an image to be inputted, the CNN 130 and the RPN 140 may more accurately generate CNN confidence scores and RPN confidence scores corresponding to said image to be inputted.

Since the training processes of the present disclosure have been explained, testing processes of the present disclosure will be presented below. In one example, a test device performing the testing processes may be installed on an autonomous vehicle.

Figure 3:
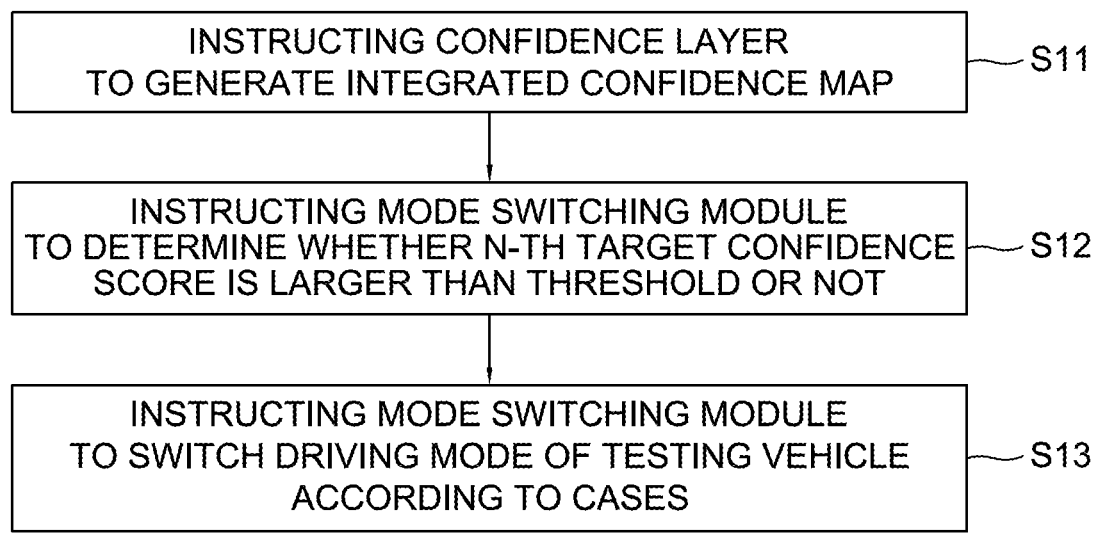
FIG. 3 is a drawing schematically illustrating a flow of the testing method for switching the modes of the autonomous vehicle based on the on-device standalone prediction to thereby achieve the safety of the autonomous driving in accordance with one example embodiment of the present disclosure.

FIG. 3 is a drawing schematically illustrating a flow of the testing method for switching the modes of the autonomous vehicle based on the on-device standalone prediction to thereby achieve the safety of the autonomous driving in accordance with one example embodiment of the present disclosure.

By referring to FIG. 3, a testing method of the present disclosure can be seen briefly. Specifically, at a step of S11, if a test image corresponding to an N-th frame of a driving video for testing acquired from an external camera or an external sensor of a testing vehicle is acquired, a testing device may instruct the CNN 130 and the RPN 140, which have been trained, to generate an estimated object detection result for testing and an integrated confidence map for testing. And, as can be seen in steps of S12 and S13, processes are performed by a mode switching module 180. Below, such processes will be explained in detail.

Specifically, on condition that (1) the learning device 100, if a training image is acquired, has instructed the convolutional layer included in the CNN 130 to generate at least one convolutional feature map for training by applying the convolutional operation to the training image; (2) the learning device 100, during a process of generating estimated ROIs for training on the training image by applying the anchor operation to the convolutional feature map for training, has instructed the anchor layer included in the RPN 140 to generate each of one or more RPN confidence scores for training for each of pixels in the convolutional feature map for training, representing each of one or more probabilities for training of the estimated ROIs for training being same as GT ROIs, to thereby generate an RPN confidence map for training including the RPN confidence scores for training; (3) the learning device 100, if at least one ROI-Pooled feature map for training is acquired, which has been generated by using the convolutional feature map for training and the estimated ROIs for training through the ROI pooling layer included in the CNN 130, during a process of generating an estimated object detection result for training by using the ROI-Pooled feature map for training, has instructed the FC layer included in the CNN 130 to generate each of CNN confidence scores for training for each of the estimated ROIs for training, representing each of one or more probabilities for training of each of one or more estimated CNN classification results for training and each of one or more estimated CNN regression results for training included in the estimated object detection result for training being same as each of one or more GT CNN classification results and each of one or more GT CNN regression results included in a GT object detection result, to thereby generate a CNN confidence map for training including the CNN confidence scores for training; and (4) the learning device 100 has instructed the loss layer 150 to generate at least one RPN loss and at least one CNN loss by referring to the RPN confidence map for training, the CNN confidence map for training, the estimated object detection result for training and the GT object detection result, and perform backpropagation by using the RPN loss and the CNN loss to learn at least part of parameters in the CNN 130 and the RPN 140, the testing device, if the test image, corresponding to the N-th frame of the driving video for testing, is acquired, may instruct the convolutional layer included in the CNN 130 to generate at least one convolutional feature map for testing by applying the convolutional operation to the test image.

After, the testing device, during a process of generating estimated ROIs for testing on the test image by applying the anchor operation to the convolutional feature map for testing, may instruct the anchor layer included in the RPN 140 to generate each of one or more RPN confidence scores for testing for each of pixels in the convolutional feature map for testing, representing each of one or more probabilities for testing of the estimated ROIs for testing being same as Ground-Truth (GT) ROIs, to thereby generate an RPN confidence map for testing including the RPN confidence scores for testing. To be simple, similar to that of the learning method, the RPN confidence scores for testing may denote accuracies of determination results for each of the pixels, generated by the RPN 140.

Thereafter, the testing device, if at least one ROI-Pooled feature map for testing is acquired, which has been generated by using the convolutional feature map for testing and the estimated ROIs for testing through the ROI pooling layer included in the CNN 130, during a process of generating an estimated object detection result for testing by using the ROI-Pooled feature map for testing, may instruct the FC layer included in the CNN 130 to generate each of CNN confidence scores for testing for each of the estimated ROIs for testing, representing each of one or more probabilities for testing of each of one or more estimated CNN classification results for testing and each of one or more estimated CNN regression results for testing included in the estimated object detection result for testing being same as each of one or more GT CNN classification results and each of one or more GT CNN regression results included in a GT object detection result, to thereby generate a CNN confidence map for testing including the CNN confidence scores for testing.

Finally, the testing device may instruct the confidence layer 160 to generate an integrated confidence map for testing including integrated confidence scores for testing by referring to the RPN confidence map for testing and the CNN confidence map for testing.

Figure 4:
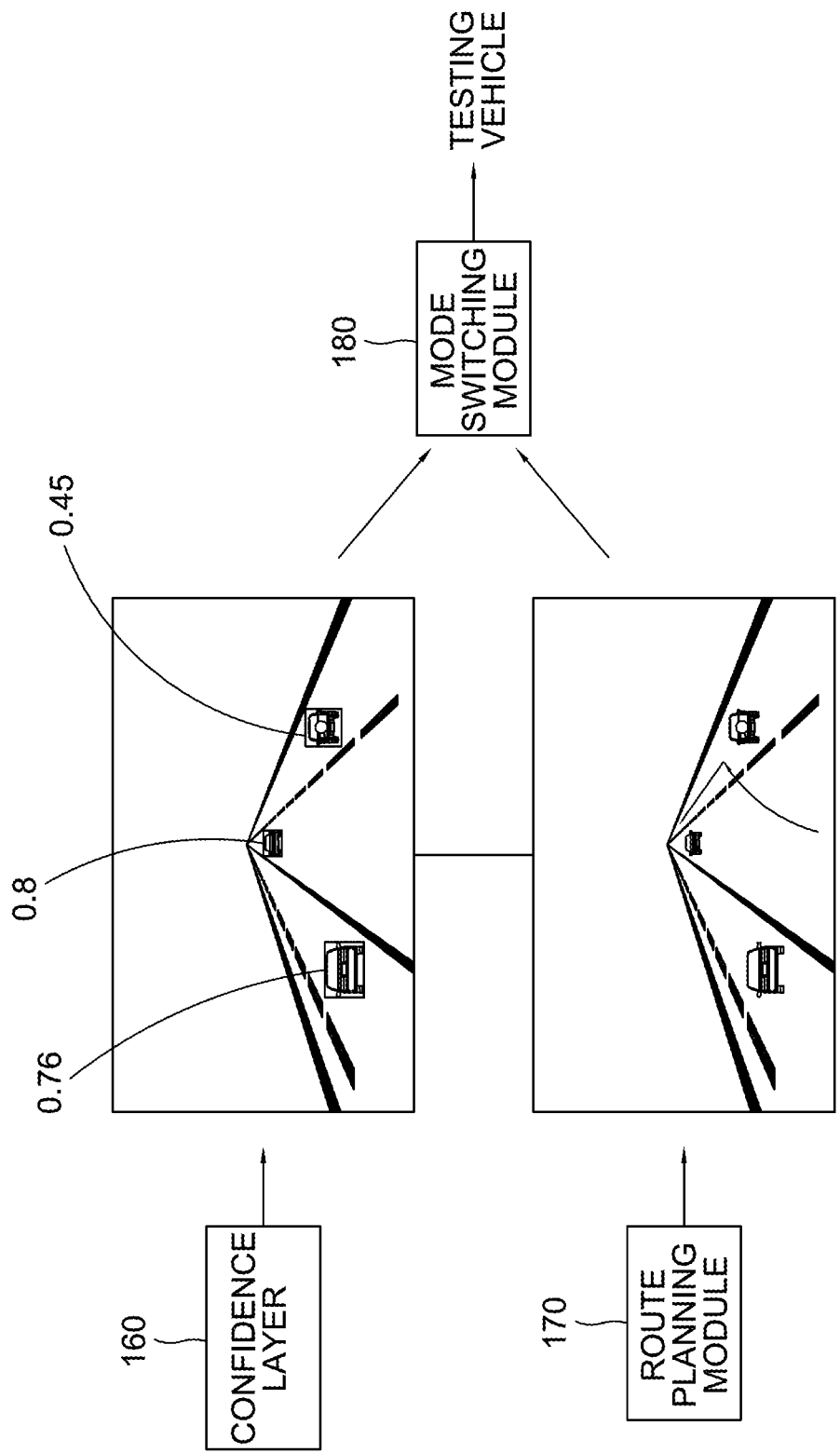
FIG. 4 is a drawing schematically illustrating how a mode switching module works, wherein the mode switching module is to be used for performing the testing method for switching the modes of the autonomous vehicle based on the on-device standalone prediction to thereby achieve the safety of the autonomous driving, in accordance with one example embodiment of the present disclosure.

After the integrated confidence map for testing is generated, the testing device may instruct a route planning module 170, to be explained by referring to FIG. 4, to generate route information on a scheduled route to be driven by the testing vehicle during a prescribed time range from a timing corresponding to the N-th frame, in a space corresponding to the testing space, by referring to the test image. As an example, the route planning module 170 may generate the route information by further referring to the estimated object detection result. Thereafter, the testing device may instruct the mode switching module 180, to be explained by referring to FIG. 4, to select at least one N-th target confidence score for the N-th frame, corresponding to the scheduled route by referring to the integrated confidence map for testing and the route information, among the integrated confidence scores for testing. By referring to FIG. 4, how the N-th target confidence score can be selected will be explained below.

FIG. 4 is a drawing schematically illustrating how a mode switching module works, wherein the mode switching module is used for performing the testing method for switching the modes of the autonomous vehicle based on the on-device standalone prediction to thereby achieve the safety of the autonomous driving, in accordance with one example embodiment of the present disclosure.

By referring to FIG. 4, it can be seen that the route information indicates that the scheduled route corresponds to a movement to a right side. Thus, the N-th target confidence score may be 0.45, which corresponds to a lane located in the right of the testing vehicle. The N-th target confidence score can be selected by referring to the route information and the integrated confidence map for testing as shown above.

Such target confidence scores can be selected for each frame. In this circumstance, the testing device may instruct the mode switching module 180 to change a driving mode of the testing vehicle from an autonomous driving mode to a manual driving mode, if (i) the N-th target confidence score is smaller than or equal to a threshold and (ii) at least part of an (N−K)-th target confidence score to an (N−1)-th target confidence score, each corresponding to an (N−K)-th frame to an (N−1)-th frame, are smaller than or equal to the threshold. That is, if target confidence scores are constantly small, it may be dangerous to drive autonomously, thus the driving mode is changed.

Or, if the N-th target confidence score is smaller than or equal to the threshold and the (N−K)-th target confidence score to the (N−1)-th target confidence score are decreasing in order, it also may cause danger, thus the driving mode can be switched from the autonomous driving mode to the manual driving mode.

Herein, for reference, an additional explanation on how the CNN 130, the RPN 140, the loss layer 150 and the confidence layer 160 interwork to generate the confidence scores while performing the object detection, will be given by referring to FIG. 5.

Figure 5:
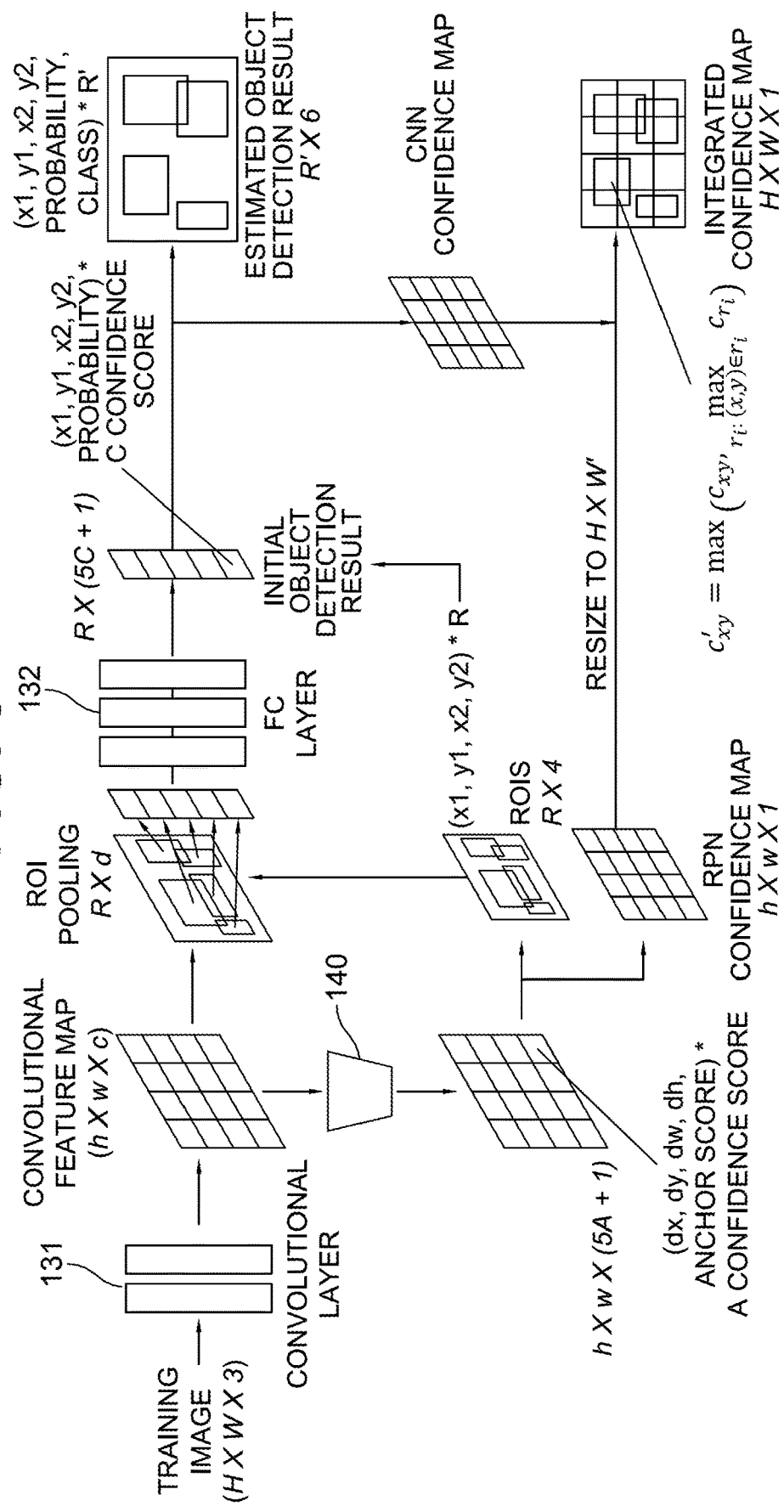
FIG. 5 is a drawing schematically illustrating a learning device including a Convolutional Neural Network (CNN), a Region Proposal Network (RPN), a loss layer and a confidence layer to be used for performing the learning method for switching the modes of the autonomous vehicle based on the on-device standalone prediction to thereby achieve the safety of the autonomous driving in accordance with one example embodiment of the present disclosure.

FIG. 5 is a drawing schematically illustrating the learning device including the CNN, the RPN, the loss layer and the confidence layer to be used for performing the learning method for switching the modes of the autonomous vehicle based on the on-device standalone prediction to thereby achieve the safety of the autonomous driving in accordance with one example embodiment of the present disclosure.

By referring to FIG. 5, it can be seen that the training image is inputted to the convolutional layer 131 in the CNN 130, and the convolutional feature map with a size of h×w×c is outputted therefrom. Then, the convolutional feature map may be processed by the RPN 140, and the RPN 140 may output a feature map with a size of h×w×(5A+1), in which locations of the ROIs shown as (dx, dy, dw, dh) and their RPN confidence scores are included. The ROIs may be delivered to the ROI pooling layer(not illustrated) in the CNN 130, thus the convolutional feature map may be pooled by referring to the ROIs accordingly. Thereafter, the FC layer 132 in the CNN 130 may process the ROI-pooled feature map with a size of R×d to generate the initial object detection result with a size of R×(5C+1), in which estimated locations of objects shown as (x1, y1, x2, y2), their probabilities of being included in each of classes, and CNN confidence scores for each of pixels corresponding to the objects are included. Finally, the CNN may apply the NMS to the initial object detection result to generate the estimated object detection result with a size of R'×6, in which the estimated locations of objects shown as (x1, y1, x2, y2), their estimated classes, and their probabilities of being included in said estimated classes are included. Herein R' may denote integrated ROIs generated by the NMS. The CNN confidence map may be outputted along with the estimated object detection result, and integrated with the resized RPN confidence map generated from the RPN confidence map with a size of h×w×1 to generate the integrated confidence map with a size of H×W×1. Such process is in accord with the above-explained learning method.

The present disclosure has an effect of providing a learning method for switching modes of an autonomous vehicle based on an on-device standalone prediction, to thereby achieve a safety of an autonomous driving.

The present disclosure has another effect of providing a method for generating parameters capable of representing a degree of credibility of an object detection during a process of the object detection.

The present disclosure has still another effect of providing a loss to be used for training a network for the object detection to generate the parameters while properly performing the object detection.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for generating parameters capable of representing a degree of credibility of an object detection during a process of the object detection, comprising steps of:
   (a) a learning device, if a training image is acquired, instructing at least one convolutional layer included in a Convolutional Neural Network (CNN) to generate at least one convolutional feature map by applying at least one convolutional operation to the training image;
   (b) the learning device, during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores;
   (c) the learning device, if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and
   (d) the learning device instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN.

2. The method of claim 1, wherein, at the step of (d), the learning device instructs the loss layer to generate the RPN loss by using a following formula:

$$L_{RPN}(\{p_i\}, \{t_i\}) = \frac{1}{N_{cls}}$$

$$\left( \sum_{i: p_i^* = I(p_i > 0.5)} (1.1 - c_i) L_{cls}(p_i, p_i^*) + \sum_{i: p_i^* \neq I(p_i > 0.5)} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding thereto, $t_i$ denotes an i-th estimated RPN regression result corresponding to the i-th pixel, and $t_i^*$ denotes an i-th GT RPN regression result corresponding thereto, and wherein, the i-th GT RPN classification result and the i-th GT RPN regression result correspond to the GT object detection result.

3. The method of claim 1, wherein, at the step of (d), the learning device instructs the loss layer to generate the CNN loss by using a following formula:

$$L_{CNN}(\{p_i\}, \{t_i\}) =$$

$$\frac{1}{N_{cls}} \left( \sum_{i: p_i^* = I(p_i = \text{largest score among class scores})} (1.1 - c_i) L_{cls}(p_i, p_i^*) + \sum_{i: p_i^* \neq I(p_i = \text{largest score among class scores})} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ and $N_{cls}$ denote the number of the estimated ROIs, $c_i$ denotes an i-th CNN confidence score, corresponding to an i-th estimated ROI selected from the estimated ROIs, among the CNN confidence scores, $p_i$ denotes an i-th estimated CNN classification result corresponding to the i-th estimated ROI, $p_i^*$ denotes an i-th GT CNN classification result corresponding thereto, $t_i$ denotes an i-th estimated CNN regression result corresponding to the i-th estimated ROI, and $t_i^*$ denotes an i-th GT CNN regression result corresponding thereto, and wherein the i-th estimated CNN classification result and the i-th estimated CNN regression result correspond to the estimated object detection result.

4. The method of claim 1, wherein, after the step of (c), the learning device instructs a confidence layer to generate an integrated confidence map including information on each of integrated confidence scores for each of pixels in the training image by referring to the RPN confidence map and the CNN confidence map.

5. The method of claim 4, wherein the learning device instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

6. The method of claim 5, wherein the learning device instructs the confidence layer to generate a (X_Y)-th integrated confidence score, corresponding to a coordinate (x, y) on the training image, among the integrated confidence scores, by using a following formula:

$$c'_{xy} = \max\left(c_{xy}, \max_{r_i:(x,y)\in r_i} c_{r_i}\right)$$

wherein $c_{xy}'$ denotes the (X_Y)-th integrated confidence score, $c_{xy}$ denotes a (X_Y)-th resized RPN confidence score corresponding to a coordinate (x, y) on the resized RPN confidence map, and $c_{r_i}$ denotes an i-th CNN confidence score for an i-th estimated ROI, denoted as $r_i$, including the coordinate (x, y), which has been determined in the NMS result.

7. A testing method for generating parameters capable of representing a degree of credibility of an object detection during a process of the object detection, comprising steps of:
(a) on condition that (1) a learning device has instructed at least one convolutional layer included in a Convolutional Neural Network (CNN) to generate at least one convolutional feature map for training by applying at least one convolutional operation to a training image; (2) the learning device, during a process of generating estimated Regions-Of-Interest (ROIs) for training on the training image by applying at least one anchor operation to the convolutional feature map for training, has instructed at least one anchor layer included in a Region Proposal Network (RPN) to generate each of one or more RPN confidence scores for training for each of pixels in the convolutional feature map for training, representing each of one or more probabilities for training of the estimated ROIs for training being same as Ground-Truth (GT) ROIs, to thereby generate an RPN confidence map for training including the RPN confidence scores for training; (3) the learning device, if at least one ROI-Pooled feature map for training is acquired, which has been generated by using the convolutional feature map for training and the estimated ROIs for training through an ROI pooling layer included in the CNN, during a process of generating an estimated object detection result for training by using the ROI-Pooled feature map for training, has instructed an FC layer included in the CNN to generate each of CNN confidence scores for training for each of the estimated ROIs for training, representing each of one or more probabilities for training of each of one or more estimated CNN classification results for training and each of one or more estimated CNN regression results for training included in the estimated object detection result for training being same as each of one or more GT CNN classification results and each of one or more GT CNN regression results included in a GT object detection result, to thereby generate a CNN confidence map for training including the CNN confidence scores for training; and (4) the learning device has instructed a loss layer to generate at least one RPN loss and at least one CNN loss by referring to the RPN confidence map for training, the CNN confidence map for training, the estimated object detection result for training and the GT object detection result, and perform backpropagation by using the RPN loss and the CNN loss to learn at least part of parameters in the CNN and the RPN, a testing device, if a test image, corresponding to an N-th frame of a driving video for testing, is acquired, instructing the convolutional layer included in the CNN to generate at least one convolutional feature map for testing by applying the convolutional operation to the test image;
(b) the testing device, during a process of generating estimated ROIs for testing on the test image by applying the anchor operation to the convolutional feature map for testing, instructing the anchor layer included in the RPN to generate each of one or more RPN confidence scores for testing for each of pixels in the convolutional feature map for testing, representing each of one or more probabilities for testing of the estimated ROIs for testing being same as Ground-Truth (GT) ROIs, to thereby generate an RPN confidence map for testing including the RPN confidence scores for testing;
(c) the testing device, if at least one ROI-Pooled feature map for testing is acquired, which has been generated by using the convolutional feature map for testing and the estimated ROIs for testing through the ROI pooling layer included in the CNN, during a process of generating an estimated object detection result for testing by using the ROI-Pooled feature map for testing, instructing the FC layer included in the CNN to generate each of CNN confidence scores for testing for each of the estimated ROIs for testing, representing each of one or more probabilities for testing of each of one or more estimated CNN classification results for testing and each of one or more estimated CNN regression results for testing included in the estimated object detection result for testing being same as each of one or more GT CNN classification results and each of one or more GT CNN regression results included in a GT object detection result, to thereby generate a CNN confidence map for testing including the CNN confidence scores for testing; and
(d) the testing device instructing a confidence layer to generate an integrated confidence map for testing including integrated confidence scores for testing by referring to the RPN confidence map for testing and the CNN confidence map for testing.

8. The method of claim 7, wherein the testing device instructs the confidence layer to perform (i-1) a process of acquiring a Non-Maximum Suppression (NMS) result for testing on the estimated ROIs for testing generated during a process of generating the estimated object detection result for testing, from the CNN, (i-2) a process of generating a resized RPN confidence map for testing by applying at least one resizing operation to the RPN confidence map for testing, and (ii) a process of generating the integrated confidence map for testing by referring to the NMS result for testing and the resized RPN confidence map for testing.

9. The method of claim 8, wherein the testing device instructs the confidence layer to generate a (X_Y)-th integrated confidence score for testing, corresponding to a coordinate (x,y) on the test image, among the integrated confidence scores for testing, by using a following formula:

$$c'_{xy} = \max\left(c_{xy}, \max_{r_i:(x,y)\in r_i} c_{r_i}\right)$$

wherein $c_{xy}'$ denotes the (X_Y)-th integrated confidence score for testing, $c_{xy}$ denotes a (X_Y)-th resized RPN confidence score for testing corresponding to a coordinate (x,y) on the resized RPN confidence map for testing, and $c_{r_i}$ denotes an i-th CNN confidence score for testing for an i-th estimated ROI for testing, denoted as $r_i$, including the coordinate (x, y), which has been determined in the NMS result for testing.

10. The method of claim 7, further comprising a step of:
(e) the testing device, if route information representing a scheduled route to be driven by a testing vehicle during a prescribed time range from a timing corresponding to the N-th frame, which has been generated by a route planning module interworking with the testing vehicle, is acquired, instructing a mode switching module to (i) select at least one N-th target confidence score for the N-th frame, corresponding to the scheduled route by referring to the integrated confidence map for testing and the route information, among the integrated confidence scores for testing, and (ii) determine whether the N-th target confidence score is larger than a threshold or not.

11. The method of claim 10, wherein the testing device instructs the mode switching module to change a driving mode of the testing device from an autonomous driving mode to a manual driving mode, if (i) the N-th target confidence score is smaller than or equal to the threshold and (ii) at least part of an (N−K)-th target confidence score to an (N−1)-th target confidence score, each corresponding to an (N−K)-th frame to an (N−1)-th frame, are smaller than or equal to the threshold, wherein K is an arbitrary integer smaller than N.

12. The method of claim 10, wherein the testing device instructs the mode switching module to change a driving mode of the testing device from an autonomous driving mode to a manual driving mode, if (i) the N-th target confidence score is smaller than or equal to the threshold and (ii) an (N−K)-th target confidence score to an (N−1)-th target confidence score, each corresponding to an (N−K)-th frame to an (N−1)-th frame, are decreasing in order, wherein K is an arbitrary integer smaller than N.

13. A learning device for generating parameters capable of representing a degree of credibility of an object detection during a process of the object detection, comprising:
at least one memory that stores instructions; and
at least one processor configured to execute the instructions to perform processes of: (I) if a training image is acquired, instructing at least one convolutional layer included in a Convolutional Neural Network (CNN) to generate at least one convolutional feature map by applying at least one convolutional operation to the training image; (II) during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores; (III) if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (IV) instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN.

14. The device of claim 13, wherein, at the process of (IV), the processor instructs the loss layer to generate the RPN loss by using a following formula:

$$L_{RPN}(\{p_i\}, \{t_i\}) = \frac{1}{N_{cls}}\left(\sum_{i:p_i^*=I(p_i>0.5)}(1.1-c_i)L_{cls}(p_i, p_i^*) + \sum_{i:p_i^* \neq I(p_i>0.5)}(0.1+c_i)L_{cls}(p_i, p_i^*) + \sum_i c_i \log c_i\right) + \lambda\frac{1}{N_{reg}}\sum_i p_i^* L_{reg}(t_i, t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding thereto, $t_i$ denotes an i-th estimated RPN regression result corresponding to the i-th pixel, and $t_i^*$ denotes an i-th GT RPN regression result corresponding thereto, and
wherein, the i-th GT RPN classification result and the i-th GT RPN regression result correspond to the GT object detection result.

15. The device of claim 13, wherein, at the process of (IV), the processor instructs the loss layer to generate the CNN loss by using a following formula:

$$L_{CNN}(\{p_i\}, \{t_i\}) =$$

$$\frac{1}{N_{cls}}\left(\sum_{i: p_i^* = I(p_i = \text{largest score among class scores})} (1.1 - c_i)L_{cls}(p_i, p_i^*) + \sum_{i: p_i^* \neq I(p_i = \text{largest score among class scores})} (0.1 + c_i)L_{cls}(p_i, p_i^*) + \sum_i c_i \log c_i\right) + \lambda \frac{1}{N_{reg}} \sum_i p_i^* L_{reg}(t_i, t_i^*)$$

wherein $N_{reg}$ and $N_{cls}$ denote the number of the estimated ROIs, $c_i$ denotes an i-th CNN confidence score, corresponding to an i-th estimated ROI selected from the estimated ROIs, among the CNN confidence scores, $p_i$ denotes an i-th estimated CNN classification result corresponding to the i-th estimated ROI, $p_i^*$ denotes an i-th GT CNN classification result corresponding thereto, $t_i$ denotes an i-th estimated CNN regression result corresponding to the i-th estimated ROI, and $t_i^*$ denotes an i-th GT CNN regression result corresponding thereto, and wherein the i-th estimated CNN classification result and the i-th estimated CNN regression result correspond to the estimated object detection result.

16. The device of claim 13, wherein, after the process of (III), the processor instructs a confidence layer to generate an integrated confidence map including information on each of integrated confidence scores for each of pixels in the training image by referring to the RPN confidence map and the CNN confidence map.

17. The device of claim 16, wherein the processor instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

18. The device of claim 17, wherein the processor instructs the confidence layer to generate a (X_Y)-th integrated confidence score, corresponding to a coordinate (x, y) on the training image, among the integrated confidence scores, by using a following formula:

$$c'_{xy} = \max\left(c_{xy}, \max_{r_i:(x,y)\in r_i} c_{r_i}\right)$$

wherein $c_{xy}'$ denotes the (X_Y)-th integrated confidence score, $c_{xy}$ denotes a (X_Y)-th resized RPN confidence score corresponding to a coordinate (x, y) on the resized RPN confidence map, and $c_{r_i}$ denotes an i-th CNN confidence score for an i-th estimated ROI, denoted as $r_i$, including the coordinate (x, y), which has been determined in the NMS result.

19. A testing device for generating parameters capable of representing a degree of credibility of an object detection during a process of the object detection, comprising:
at least one memory that stores instructions; and
at least one processor configured to execute the instructions to perform processes of: (I) on condition that (1) a learning device has instructed at least one convolutional layer included in a Convolutional Neural Network (CNN) to generate at least one convolutional feature map for training by applying at least one convolutional operation to a training image; (2) the learning device, during a process of generating estimated Regions-Of-Interest (ROIs) for training on the training image by applying at least one anchor operation to the convolutional feature map for training, has instructed at least one anchor layer included in a Region Proposal Network (RPN) to generate each of one or more RPN confidence scores for training for each of pixels in the convolutional feature map for training, representing each of one or more probabilities for training of the estimated ROIs for training being same as Ground-Truth (GT) ROIs, to thereby generate an RPN confidence map for training including the RPN confidence scores for training; (3) the learning device, if at least one ROI-Pooled feature map for training is acquired, which has been generated by using the convolutional feature map for training and the estimated ROIs for training through an ROI pooling layer included in the CNN, during a process of generating an estimated object detection result for training by using the ROI-Pooled feature map for training, has instructed an FC layer included in the CNN to generate each of CNN confidence scores for training for each of the estimated ROIs for training, representing each of one or more probabilities for training of each of one or more estimated CNN classification results for training and each of one or more estimated CNN regression results for training included in the estimated object detection result for training being same as each of one or more GT CNN classification results and each of one or more GT CNN regression results included in a GT object detection result, to thereby generate a CNN confidence map for training including the CNN confidence scores for training; and (4) the learning device has instructed a loss layer to generate at least one RPN loss and at least one CNN loss by referring to the RPN confidence map for training, the CNN confidence map for training, the estimated object detection result for training and the GT object detection result, and perform backpropagation by using the RPN loss and the CNN loss to learn at least part of parameters in the CNN and the RPN, if a test image, corresponding to an N-th frame of a driving video for testing, is acquired, instructing the convolutional layer included in the CNN to generate at least one convolutional feature map for testing by applying the convolutional operation to the test image; (II) during a process of generating estimated ROIs for testing on the test image by applying the anchor operation to the convolutional feature map for testing, instructing the anchor layer included in the RPN to generate each of one or more RPN confidence scores for testing for each of pixels in the convolutional feature map for testing, representing each of one or more probabilities for testing of the estimated ROIs for testing being same as Ground-Truth (GT) ROIs, to thereby generate an RPN confidence map for testing including the RPN confidence scores for testing; (III) if at least one ROI-Pooled feature map for testing is acquired, which has been generated by using the convolutional feature map for testing and the estimated ROIs for testing through the ROI pooling layer included in the CNN, during a process of generating an estimated object detection result for testing by using the ROI-Pooled feature map for testing, instructing the FC layer included in the CNN to generate each of CNN confidence scores for testing for each of the estimated ROIs for testing, representing each of one or more probabilities for testing of each of one or more estimated CNN classification results for testing and each of one or more estimated CNN regression results for testing included in the estimated object detection result for testing being same as each of one or more GT CNN classification results and each of one or more GT CNN regression results included in a GT object detection result, to thereby generate a CNN confidence map for testing including the CNN confidence scores for testing; and (IV) instructing a confidence layer to generate an integrated confidence map for testing including integrated confidence scores for testing by referring to the RPN confidence map for testing and the CNN confidence map for testing.

20. The device of claim 19, wherein the processor instructs the confidence layer to perform (i-1) a process of acquiring a Non-Maximum Suppression (NMS) result for testing on the estimated ROIs for testing generated during a process of generating the estimated object detection result for testing, from the CNN, (i-2) a process of generating a resized RPN confidence map for testing by applying at least one resizing operation to the RPN confidence map for testing, and (ii) a process of generating the integrated confidence map for testing by referring to the NMS result for testing and the resized RPN confidence map for testing.

21. The device of claim 20, wherein the processor instructs the confidence layer to generate a (X_Y)-th integrated confidence score for testing, corresponding to a coordinate (x,y) on the test image, among the integrated confidence scores for testing, by using a following formula:

$$c'_{xy} = \max\left(c_{xy}, \max_{r_i:(x,y)\in r_i} c_{r_i}\right)$$

wherein $c_{xy}'$ denotes the (X_Y)-th integrated confidence score for testing, $c_{xy}$ denotes a (X_Y)-th resized RPN confidence score for testing corresponding to a coordinate (x,y) on the resized RPN confidence map for testing, and $c_{r_i}$ denotes an i-th CNN confidence score for testing for an i-th estimated ROI for testing, denoted as $r_i$, including the coordinate (x, y), which has been determined in the NMS result for testing.

22. The device of claim 19, wherein the processor further performs a process of:
(V) if route information representing a scheduled route to be driven by a testing vehicle during a prescribed time range from a timing corresponding to the N-th frame, which has been generated by a route planning module interworking with the testing vehicle, is acquired, instructing a mode switching module to (i) select at least one N-th target confidence score for the N-th frame, corresponding to the scheduled route by referring to the integrated confidence map for testing and the route information, among the integrated confidence scores for testing, and (ii) determine whether the N-th target confidence score is larger than a threshold or not.

23. The device of claim 22, wherein the processor instructs the mode switching module to change a driving mode of the testing device from an autonomous driving mode to a manual driving mode, if (i) the N-th target confidence score is smaller than or equal to the threshold and (ii) at least part of an (N−K)-th target confidence score to an (N−1)-th target confidence score, each corresponding to an (N−K)-th frame to an (N−1)-th frame, are smaller than or equal to the threshold, wherein K is an arbitrary integer smaller than N.

24. The device of claim 22, wherein the processor instructs the mode switching module to change a driving mode of the testing device from an autonomous driving mode to a manual driving mode, if (i) the N-th target confidence score is smaller than or equal to the threshold and (ii) an (N−K)-th target confidence score to an (N−1)-th target confidence score, each corresponding to an (N−K)-th frame to an (N−1)-th frame, are decreasing in order, wherein K is an arbitrary integer smaller than N.

* * * * *